(No Model.)

H. HAMMOND.
MANUFACTURE OF AXES.

No. 407,591. Patented July 23, 1889.

Witnesses,
C. E. Buckland,
Willard Eddy.

Inventor,
Henry Hammond
by Albert H. Walker Atty

UNITED STATES PATENT OFFICE.

HENRY HAMMOND, OF NEW HAVEN, CONNECTICUT.

MANUFACTURE OF AXES.

SPECIFICATION forming part of Letters Patent No. 407,591, dated July 23, 1889.

Application filed November 15, 1888. Serial No. 290,881. (No model.)

*To all whom it may concern:*

Be it known that I, HENRY HAMMOND, of New Haven, Connecticut, have invented a new and useful Improvement in the Manufacture of Axes, of which the following description and claims constitute the specification, and which is illustrated by the accompanying sheet of drawings.

This invention relates to manufacturing axes and other analogous implements by first forming a curved and concave bar of steel or iron and afterward cutting that bar crosswise into pieces and then forming each of those pieces into an ax-blank or an ax-poll blank and then into a completed ax.

Figure 1:
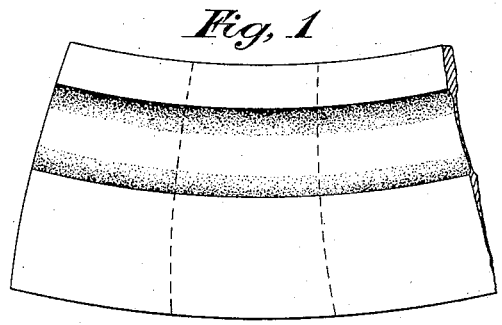
Figure 2:
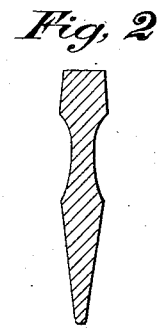
Figure 3:
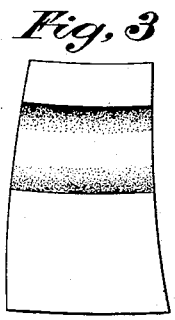
Figure 4:
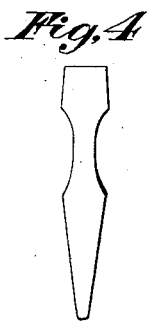
Figure 5:
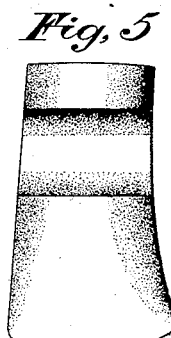
Figure 6:
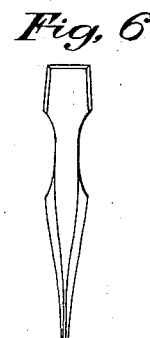
Figure 7:
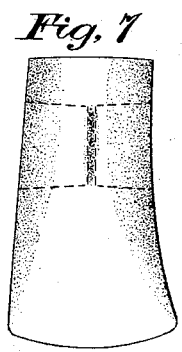
Figure 8:
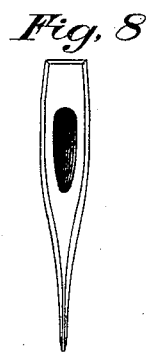
Figure 9:
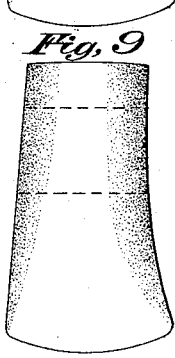
Figure 10:
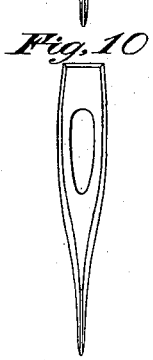
Figure 11:
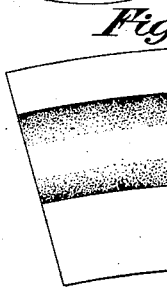
Figure 12:
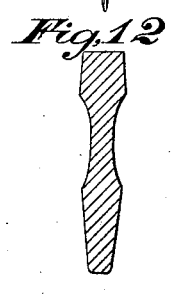

Figures 1 and 2 are a side view and a cross-section, respectively, of a bar of steel having uniform cross-sections throughout its length and uniformly curved on circular lines and having opposite curved longitudinal concavities on its two sides nearest its concave edge. Figs. 3 and 4 represent an ax-blank made by cutting off the bar of Figs. 1 and 2 on the left-hand dotted line of Fig. 1. Figs. 5 and 6 illustrate the blank of Figs. 3 and 4 after its lower portion has been drawn down and made into the form of the blade of an ax, and its upper part has been somewhat changed in contour to make it correspond with the ordinary form of the head of an ax. Figs. 7 and 8 show the blank of Figs. 5 and 6 after a chisel has been forced into each of its edges, and a tapering recess has thus been formed therein, in the place where the eye is to be located, and extending inwardly nearly to a junction with the opposite recess. Figs. 9 and 10 depict the blank of Figs. 7 and 8 after a chisel has been forced into one of those recesses and through the metal which separates it from the other, and then through that other, and thus through the entire blank from edge to edge, and after the eye of the ax has been completed and the cheeks of the ax expanded to the ultimate position and contour desired. Figs. 11 and 12 are a side view and a cross-section, respectively, of a bar of iron or other metal having uniform cross-sections throughout its length, and being uniformly curved on circular lines and having opposite curved longitudinal concavities on its two sides nearest its convex edge, and which bar for axes of the same size will be narrower than that of Figs. 1 and 2.

To manufacture axes according to my present improvement, steel bars may be rolled or otherwise made into the form shown in Figs. 1 and 2, and may be cut up into pieces of uniform length upon curved lines, the ends of each of which lines are coincident with the radius of the curved edges of the bar, and blanks such as that shown in Figs. 3 and 4 may be thus produced. Then such a blank may be straightened and made true in a die or otherwise, and then be forged into the form of Figs. 5 and 6, which form corresponds everywhere with that of a completed ax, except that instead of having an eye it has two concavities across its sides opposite to each other and opposite to the place where the eye is to be located, each of which concavities corresponds substantially in size with one-half of the eye to be made, and both of which are separated from each other by a wall of metal located exactly central to the thickness of the other parts of the blank. Then the eye is made with one or more chisels or punches having inclined sides, which as they penetrate the metal force the sides of the blank apart at the eye portion to the ultimate thickness desired for an ax at that place, and the completed ax of Figs. 9 and 10 may be thus produced; and the procedure set forth in the foregoing paragraph may begin with a bar of the form shown in Figs. 1 and 2, made of iron and steel welded longitudinally together, so as to produce an iron ax having a steel bit like those heretofore made by hand, and Bessemer or other low steel may be used instead of iron in the same way, or bars of iron or other metal may be rolled or otherwise made into the curved concave form shown in Figs. 11 and 12, and may be cut up into pieces on straight lines coincident with the radius of the two curved edges of the bar, and the blanks thus produced may be made into ax-polls in substantially the same way that the blanks of Figs. 3 and 4 are made into axes. Then those ax-polls may be made into axes by the application of ax-bits thereto in any proper manner. The curved bar of Figs. 1 and 2 is particularly adapted to be cut up into ax-blanks by being severed into pieces on the above-described curved lines, because the pieces thus produced conform more nearly to the ultimate shape of an ax than would blanks formed by cutting up a straight bar into equal pieces on parallel lines; and the bar of Figs. 11 and 12 is particularly adapted to be cut up into ax-poll blanks on radial lines, because the blanks thus produced are narrower at their lower edges than at their heads, and are better adapted to the reception of an ax-bit and the drawing down and welding of the metal of their lower edges upon that ax-bit than they would be if they were made from a straight bar cut up on parallel lines.

The utility of this invention, as compared with forming a straight bar and afterward cutting that bar crosswise into pieces, and then forming each of those pieces into an ax-blank or an ax-poll blank, and then into a completed ax, resides in the fact that ax-blanks and ax-poll blanks require to be narrower at one end than the other, and therefore, when made by cutting up straight bars, necessarily involve waste of metal due to the removal of gores from between the blanks or from the edges of blanks, or involve waste of fuel and labor due to the hammering of parallel side pieces into the form of blanks narrower at one end than the other; whereas all those wastes are avoided by first forming a curved bar of metal, and afterward cutting that bar crosswise into pieces, because the pieces so produced are thus made narrower at one end than at the other without cutting away any gores and without any hammering or other operation.

I recommend that the eye be formed in an ax-blank and in an ax-poll blank without expelling any metal therefrom; but the penetrating-instrument may have a blunt edge which will expel a small amount of metal, while it also makes room for itself by forcing the metal sidewise and thus expanding the cheeks, as described. I also recommend that one or more tapering recesses be first formed and afterward enlarged into the eye; but the eye may be made without any preliminary cutting or punching, and may be made either before or after the described forming of the lower portions of the blanks or axes. So, also, I recommend that the indicated forging and cutting be done with dies and chisels operated by machinery; but the whole may be done with hand-tools.

I claim as my invention—

1. The process of making ax-blanks and ax-poll blanks, which consists in forming a curved bar of metal, and then in cutting that bar into pieces on lines the ends of which are substantially coincident with the radius of the curve of the bar, all substantially as described.

2. The process of making ax-blanks and ax-poll blanks, which consists in forming a curved bar the two edges of which are segments of concentric circles, and the two sides of which are provided with curved longitudinal concavities concentric with those circles, and then in cutting that bar into pieces on lines the ends of which are substantially coincident with the radius of those circles, all substantially as described.

3. The process of making axes, which consists in forming a curved bar of metal, the cross-section of which is nearly identical with the longitudinal section of the axes to be made, except at the sides of the bar opposite to where the eyes of the axes are to be located, where longitudinal concavities are formed, each of which is about equal in cross-section to half the cross-section of the eyes of the axes, and then cutting the bar into pieces on lines the ends of which are substantially coincident with the radius of the curved edges of the bar, and afterward forming an eye in each of those pieces with a chisel or punch, which, as it penetrates the metal between those concavities, forces the sides of the blank apart, and thus expands the blank at the eye portion to the ultimate shape desired, all substantially as described.

Dated this 14th day of November, 1888.

HENRY HAMMOND.

Witnesses:
ALBERT H. WALKER,
JOHN H. KIRKHAM.